Inventor:
George H. Foster
By [signature]
Attys.

Aug. 18, 1925.                                                  1,550,311
                        G. H. FOSTER
                      ENSILAGE REMOVER
                    Filed Feb. 1, 1923        3 Sheets-Sheet 2

Inventor:
George H. Foster

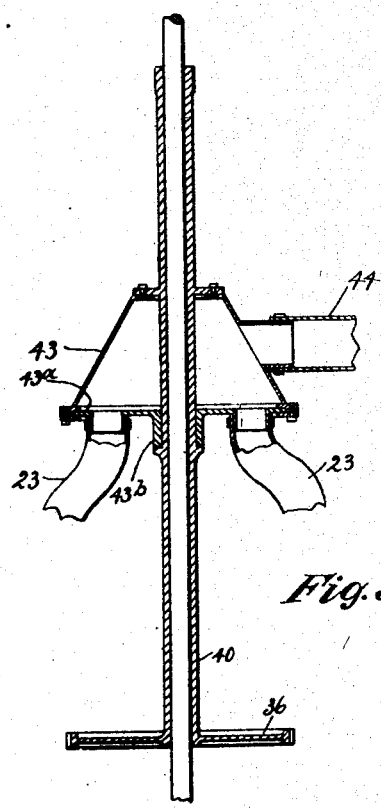
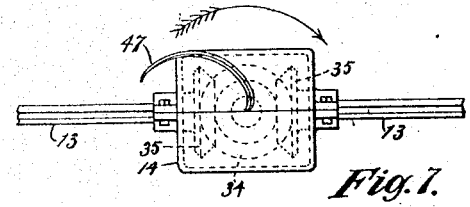
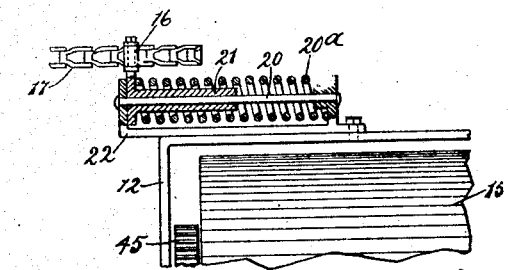
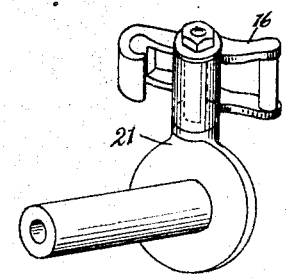
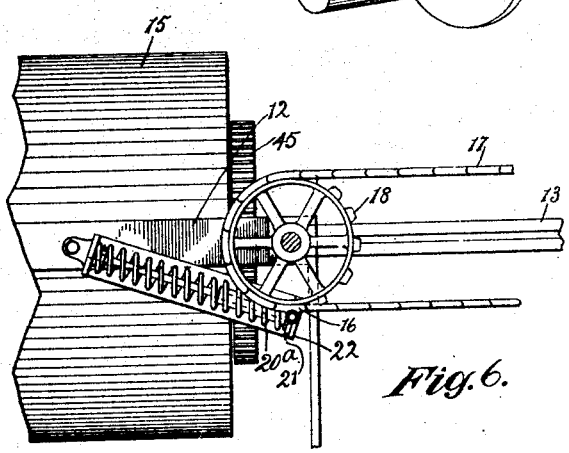

Patented Aug. 18, 1925.

1,550,311

UNITED STATES PATENT OFFICE.

GEORGE H. FOSTER, OF EVANSTON, ILLINOIS.

ENSILAGE REMOVER.

Application filed February 1, 1923. Serial No. 616,311.

*To all whom it may concern:*

Be it known that I, GEORGE H. FOSTER, a citizen of the United States, and resident of Evanston, county of Cook, and State of Illinois, have invented certain new and useful Improvements in Ensilage Removers, of which the following is a specification, and which are illustrated in the accompanying drawings, forming a part thereof.

The object of the invention is to provide mechanism for loosening impacted material, such as ensilage, and removing it from the receptacle in which it is contained.

While the invention is capable of being variously organized, a preferred form of construction is shown consisting of a pair of picker wheels with one or both of which is associated an elevator, preferably a suction tube, these devices being carried by a revolving frame and arranged each to travel in spiral paths starting from the periphery of the container and terminating at the center, and then in such paths starting from the center and terminating at the periphery. Suitable driving mechanism is provided for causing the desired movement of the picker and elevating mechanism, and to permit it to follow the lowering surface of the material.

Although the invention is primarily adapted for the purpose of removing ensilage from high silos, it is, of course, capable of use for removing from receptacles any material which may become more or less compacted, and is capable of being loosened and carried away by an elevating device.

In the accompanying drawings illustrating the invention—

Fig. 5 is a sectional detail on the line 5—5 of Fig. 1;

Fig. 6 is a detail, partly in section but mainly a plan view, on the line 6—6 of Fig. 1;

Fig. 7 is a detail inverted plan view of the central portion of the device; and

Fig. 8 is a detail of a sprocket link used in the device; and

Fig. 9 is a detail side view of parts appearing in plan and plan section in Fig. 6.

The upper portion of an ordinary silo is shown at 10, and, as usual, is in circular form. The picker wheels, as 11, here shown as comprising a plurality of teeth radiating from a shaft, are carried by frames, as 12, each frame being slidably mounted upon a shaft 13 which projects radially from a gear box 14 at the center of the machine.

Figure 1:
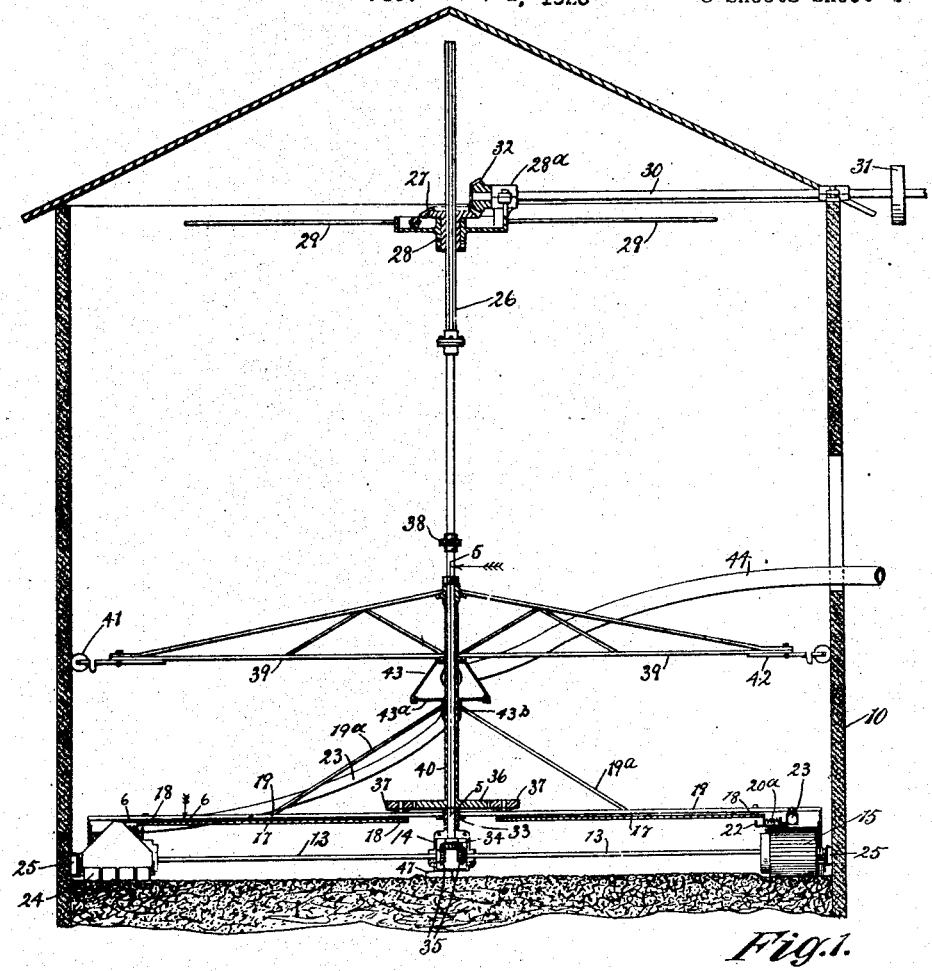
Fig. 1 is a detail vertical central section of a silo with the improved ensilage remover mounted therein.
Figure 2:
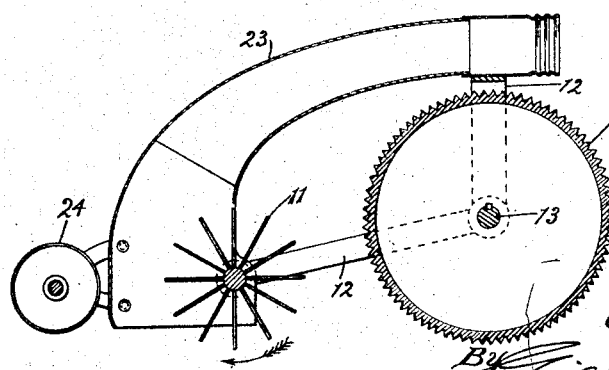
Fig. 2 is a detail section on the line 2—2 of Fig. 3.
Figure 4:
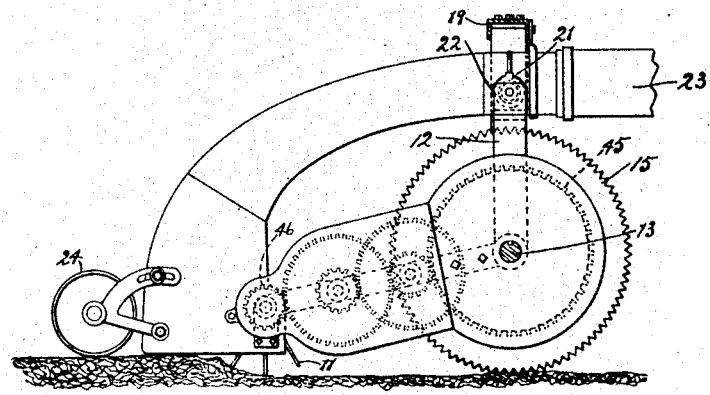
Fig. 4 is a detail showing a side elevation of the parts shown in Figs. 2 and 3.
Figure 3:
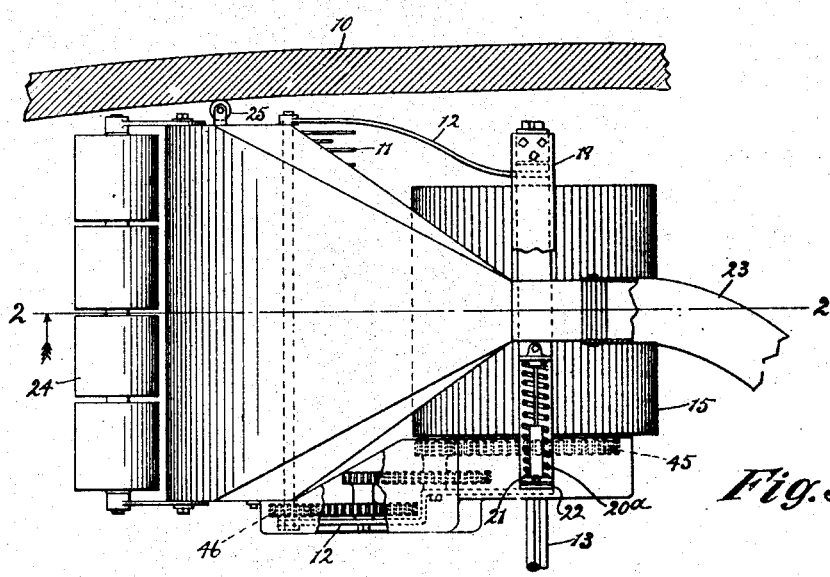
Fig. 3 is a detail plan view, partly in section and some parts being broken away, of one of the picker wheels and its associated devices.

Between the side arms of the frame 12 there is mounted a roller 15, preferably having its surface corrugated or notched, as plainly shown in Fig. 2, this roller being splined upon the shaft 13 and driven thereby. The frame 12 is attached to a special link 16 of a sprocket chain 17, carried by a pair of sprocket wheels, as 18, the shafts of which are journaled in cross-bars 19 extending outwardly from the center of the machine.

This attachment is accomplished by means of a rod 20 slidable through a swiveled arm 21 depending from the link 16, the rod 20 being carried by a bracket 22 pivotally attached to the frame 12. A compression spring 20$^a$ reacting between one end of the bracket 22 and the member 21 permits this member to slide on the rod 20 as the link 16 travels around the sprocket wheel 18 while the roller 15 is at the outer end of the shaft 13.

The frame 12 also carries the receiving end 23 of an elevator preferably, as shown, in the form of a suction tube. The mouth of this tube partly incloses the picker wheel 11, and hence directly receives the material loosened thereby. At the forward end of the mouth of the tube 23 there is mounted a vertically adjustable guide roller 24, which travels on the unloosened material and may be set to determine the depth to which the teeth of the picker wheel will enter it.

A roller 25 is preferably carried by the picker wheel head for engagement with the walls of the silo, and serves to loosen any material which may tend to adhere to the wall, and lessens the friction against the wall as the link 16 turns about the sprocket 18.

The mechanism thus far described is driven by means of a shaft 26, located on the vertical axis of the silo and being capable of longitudinal movement. This shaft is in splined engagement with a bevel gear 27, journaled in a box 28 carried by suitable rods 29, extending to and anchored in the side walls of the silo. Power may be applied by means of a horizontal shaft 30 suitably journaled in a box 28ª, and in a box at the side wall of the silo, and projecting beyond this wall and carrying a driving pulley 31 or other power means. Upon the inner end of the shaft 30 there is mounted a bevel gear 32, which meshes with the gear 27. The lower end of the shaft 26 is journaled in a box 33, carried by the arms 19, and projects into the gear box 14 and at its lower end carries a bevel gear 34, which meshes with similar gears 35, one carried by each of the shafts 13. A gear wheel 36 is fixed upon the lower end of the sleeve 40 fixed to the cross beam 39, immediately above the arms 19, and has no turning movement. This gear is engaged by a pair of pinions 37, one mounted upon the upwardly projecting end of the shaft of the sprocket wheel 18 carrying the inner end of each of the chains 17.

The shaft 26 is preferably sectional, as indicated at 38, permitting it to be lengthened as the surface of the material is substantially lowered, by the insertion of additional sections, thus reducing the range of travel of its upper end through the gear 27.

The shaft 26 is further laterally stayed by means of a pair of arms 39 extending outwardly from the upper end of the sleeve 40, encircling the shaft, and carrying at their outer ends rollers 41 which bear against the silo walls, being mounted in brackets 42.

The pipe 23 preferably leads to a casing 43 from which leads a suction pipe 44, extending through the silo wall to any desired point or points of discharge. The upper member of the casing 43 is fixed to the cross arms 39, 39 and to it the pipe 44 is connected. The bottom 43ª of the casing, to which the pipe section 23 is attached is fixed to a collar 43ᵇ through which the sleeve passes and which is rigidly connected with the arms 19 by means of brace rods 19ª. The upper member of the casing 43 is therefore held against rotation while its bottom 43ª turns with the rollers 15.

Each of the picker wheels 11 is driven from the shaft 13 through the medium of a train of gears comprising a gear 45, fixed to the roller 15, and a gear 46 fixed on the picker shaft, the several gears of the train being preferably so proportioned as to give the picker wheel a high speed. As the shafts 13 are driven by the shaft 26 the rollers 15 are turned and caused to travel over the surface of the ensilage, the picker wheels 11 being turned in the direction of the arrow (Fig. 2), loosening the material and throwing it upwardly into the throat of the suction tube 23. The gear wheel 36 being stationary, the pinions 37, 37, revolve around and are rotated by it, causing the travel of the sprocket chains 17 upon the wheels 18 by which they are carried. The frame 12 and the parts carried thereby are thus caused to travel continuously between the center of the silo and its walls. As the movement of the sprocket chains is comparatively slow the rollers 15 will travel in a spiral path, and the various gears may be so proportioned that the zones of action of the picker wheels in successive revolutions will overlap. As the link 16 engages either of the sprocket wheels there is substantially no inward or outward travel of the frames 12 for a sufficient period to permit it to make a complete circle, thus leaving no portion of the surface of the material unacted upon with the exception of that which is immediately below the gear case 14. In order to remove the material from this central portion into the zone of action of the suction tube, a vane 47, preferably curved, is secured to the bottom of the gear case 14, extending outwardly from its center.

The various changes in the arrangement of the parts of the device may be made without departing from the scope of the invention. For example; while the preferred form of picket wheel or material loosening device is shown, other forms might be used without the exercise of invention; two sets of picker wheels and associated parts are shown but obviously the number might be increased or decreased according to the judgment of the manufacturer.

So far as now advised, the mechanism and arrangement of parts for driving the picker wheel and the parts associated with it is to be preferred but any other driving means for causing these parts to travel over the surface of the material, may be used.

I claim as my invention:

1. A device for removing ensilage and like material from a storage bin comprising, in combination, an elevator, means for supporting the receiving end of the elevator in proximity with the surface of the material, and means for causing such receiving end to move over such surface.

2. A device for removing ensilage and like material from a storage bin comprising, in combination, an elevator, means for supporting the receiving end of the elevator in proximity with the surface of the material, and means for causing such receiving end to move over such surface in spiral paths.

3. A device for removing ensilage and like material from a storage bin comprising, in combination, an elevator, means for supporting the receiving end of the elevator in proximity with the surface of the material, and means for causing such receiving end to move over such surface to and from a center.

4. A device for removing ensilage and like material from a storage bin comprising, in combination, an elevator, means for automatically maintaining the receiving end of the elevator in proximity with the surface of the material, means for causing such receiving end to move over such surface, and a material loosening device located at the receiving end of the elevator.

5. A device for removing ensilage and like material from a storage bin comprising, in combination, an elevator, a support therefor, means for automatically maintaining the receiving end of the elevator in proximity with the surface of the material, means independent of said support for causing such receiving end to move over such surface, a rotative material loosening device located at the receiving end of the elevator, and means for rotating such loosening device.

6. A device for removing ensilage and like material from a storage bin comprising, in combination, a traction roller for traveling on the surface of the material, means for guiding said roller in a curved path, an elevator having its receiving end mounted with the roller, and means for turning the roller.

7. A device for removing ensilage and like material from a storage bin comprising, in combination, a traction roller for traveling on the surface of the material, means for guiding said roller in a predetermined path, an elevator having its receiving end mounted with the roller, means for turning the roller, and means for moving the roller laterally.

8. A device for removing ensilage and like material from a storage bin comprising in combination, a traction roller for traveling on the surface of the material, means for determining the path of said roller, an elevator having its receiving end mounted with the roller, a revoluble material loosening device mounted with the roller and means for positively turning the roller and the loosening device.

9. A device for removing ensilage and like material from a storage bin comprising, in combination, a traction roller for traveling on the surface of the material, means for determining the path of said roller, an elevator having its receiving end mounted with the roller, means for positively turning the roller, and a revoluble material loosening device mounted with and driven from the roller.

10. A device for removing ensilage and like material from a storage bin comprising, in combination, a vertical longitudinally movable driven shaft, a non-rotatable sleeve on the shaft, a gear wheel fixed to the sleeve, a frame swiveled on the sleeve, pinions mounted on the frame and meshing with the gear wheel, traction rollers attached to the frame for running on the material, shafts for turning the rollers being in slidable engagement therewith and geared to the vertical drive shaft, a pair of sprocket wheels associated with each roller and being mounted on the frame, one of each pair being mounted with one of the pinions, a sprocket chain running on each pair of sprocket wheels, connection between each of the rollers and one of the sprocket chains and an elevator associated with each roller and having its receiving end mounted therewith.

11. A device for removing ensilage and like material from a storage bin comprising, in combination, a vertical longitudinally movable driven shaft, a non-rotatable sleeve on the shaft, a gear wheel fixed to the sleeve, a frame swiveled on the sleeve, pinions mounted on the frame and meshing with the gear wheel, traction rollers attached to the frame for running on the material, shafts for turning the rollers being in slidable engagement therewith and geared to the vertical drive shaft, a pair of sprocket wheels associated with each roller and being mounted on the frame, one of each pair being mounted with one of the pinions, a sprocket chain running on each pair of sprocket wheels, connection between each of the rollers and one of the sprocket chains, an elevator associated with each roller and having its receiving end mounted therewith, and a revoluble material loosening device mounted with and driven by each roller.

12. A device for removing ensilage and like material from a storage bin comprising, in combination, an elevator, means for supporting the receiving end of the elevator in proximity with the surface of the material, means for moving such receiving end over such surface, a rotative material engaging device located at the receiving end of the elevator and having rigid teeth adapted to enter said material for loosening the same, means for vertically adjusting said device whereby the teeth will extend below the receiving end of the elevator, and means for rotating said device.

13. A pneumatic elevator comprising delivery section, a receiving section, and an intermediate chamber having a non-rotative and a rotative wall through which the two first-named sections are connected with the chamber and means for causing the receiving end of the receiving elevator section to move in paths around the axis of the intermediate chamber.

14. A device for removing ensilage and like material from storage chambers, in combination, a vertical drive shaft, an elevator for conveying the material and having its receiving end mounted to travel over the surface of the material, and means actuated by the drive shaft for moving material from immediately below the shaft into the path of the elevator.

15. A device for removing ensilage and like material from a storage bin comprising, in combination, a vertical longitudinally movable driven shaft, a non-rotatable sleeve on the shaft, a gear wheel fixed to the sleeve, a frame swiveled on the sleeve, pinions mounted on the frame and meshing with the gear wheel, traction rollers attached to the frame for running on the material, shafts for turning the rollers being in slidable engagement therewith and geared to the vertical drive shaft, a pair of sprocket wheels associated with each roller and being mounted on the frame, one of each pair being mounted with one of the pinions, a sprocket chain running on each pair of sprocket wheels, yielding connection between each of the rollers and one of the sprocket chains and an elevator associated with each roller and having its receiving end mounted therewith.

16. A device for removing ensilage and like material from a storage bin comprising, in combination, a vertical longitudinally movable driven shaft, a non-rotatable sleeve on the shaft, a gear wheel fixed to the sleeve, a frame swiveled on the sleeve, pinions mounted on the frame and meshing with the gear wheel, traction rollers attached to the frame for running on the material, shafts for turning the rollers being in slidable engagement therewith and geared to the vertical drive shaft, a pair of sprocket wheels asociated with each roller and being mounted on the frame, one of each pair being mounted with one of the pinions, a sprocket chain running on each pair of sprocket wheels, yielding connection between each of the rollers and one of the sprocket chains, an elevator associated with each roller and having its receiving end mounted therewith, and a revoluble material loosening device mounted with and driven by each roller.

17. In a device for removing ensilage and like material from a storage bin comprising, in combination, an elevator, means for supporting the receiving end of said elevator in proximity to said material and for moving the elevator over said material, and means for engaging the wall of said bin for removing the material adhering thereto.

GEORGE H. FOSTER.